United States Patent [19]
Jehu et al.

[11] 3,829,140
[45] Aug. 13, 1974

[54] SAFETY DEVICE FOR VEHICLES

[75] Inventors: Victor James Jehu, Crowthorne; Leonard Charles Pearson, Wokingham, both of England

[73] Assignee: National Research Development Corporation, London, England

[22] Filed: July 31, 1973

[21] Appl. No.: 384,300

[30] Foreign Application Priority Data

Aug. 11, 1972   Great Britain.................37612/72

[52] U.S. Cl....................... 293/15, 293/38, 293/48, 293/62, 180/91
[51] Int. Cl............................................ B60r 19/00
[58] Field of Search............. 293/48, 9, 62, 15, 64, 293/16, 38, 40, 41, 44, 45, 89, 96; 180/91; 280/150 B, 150 R

[56]          References Cited
              UNITED STATES PATENTS 1,333,797   3/1920   DiLorenzo............................ 293/15
1,442,546   1/1923   Whitaker.............................. 293/15
2,928,691   3/1960   Gutman........................... 293/38 X
3,718,357   2/1973   Hertzell................................. 293/9

*Primary Examiner*—M. Henson Wood, Jr.
*Assistant Examiner*—John J. Love
*Attorney, Agent, or Firm*—Oblon, Fisher, Spivak, McClelland & Maier

[57]          ABSTRACT

A safety device for vehicles comprises a movable member which normally lies stowed but which, upon collision of the vehicle with a pedestrian, is raised by a motor to form a barrier around an upward-facing surface upon which the pedestrian may land, thus restraining him from falling off again. This surface may be part of the vehicle, e.g. the bonnet. The barrier may contain fracture devices which break if the vehicle collides with a massive object, e.g. another vehicle.

5 Claims, 3 Drawing Figures

SAFETY DEVICE FOR VEHICLES

This invention relates to safety devices for vehicles, and vehicles equipped with such devices.

It relates in particular to devices to protect a pedestrian who is struck by the vehicle. The leading edge of the vehicle bonnet should be low so as to strike pedestrians, especially children well below their centre of gravity; the edge and the leading corners should also be well rounded. If these conditions are fulfilled, impact of a moving vehicle against the legs of a pedestrian usually causes his torso and head to strike the bonnet, where the severity of impact can easily be minimised by shock-absorbing media. As the vehicle continues to travel forward, and the body is accelerated to vehicle speed, the torso slides up the bonnet towards the windscreen drawing the legs with it until the entire body is at rest on the bonnet. Were the body to remain there, serious injury would in many cases be confined to the legs. Unfortunately, the body usually slides off the bonnet on to the road, and evidence has now been found that in many cases the injuries resulting from impact with the road are more serious than those caused by the previous impact with the vehicle. It appears that there is particular danger in the common case where the brakes are first applied, fiercely, after the impact with the vehicle; this tends to throw the pedestrian forwards off the bonnet, with obvious danger that he will suffer further injuries not only from hitting the road but also from the vehicle running over him.

Our invention is a safety device for fitting to a vehicle, and operative to resist ejection from the moving vehicle of objects that have landed upon it after colliding with it. The invention is defined by the claims at the end of this specification, and embodiments of it will now be described, by way of example, with reference to the accompanying drawings in which:

Figure 1:
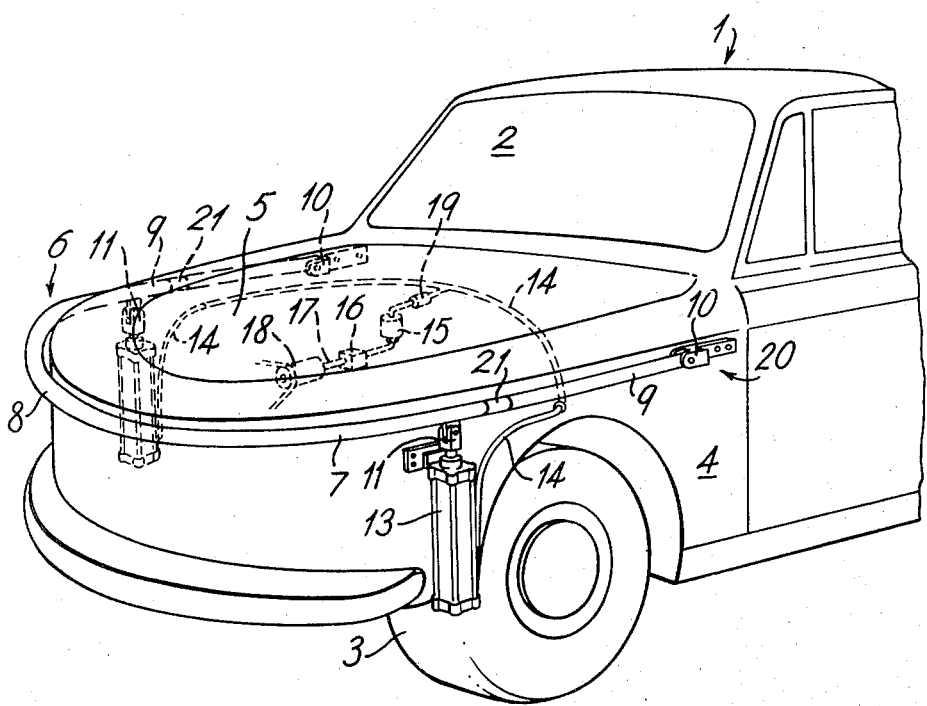
FIG. 1 is a diagrammatic perspective view of a vehicle, fitted with a safety device in its stowed position.

The vehicle 1 has a windscreen 2, front wheels 3, front side panels 4 and upward-facing bonnet 5. The safety device 6 comprises a barrier member in the form of a metal tube 7 formed into roughly U-shape with base 8 and side legs 9 and conforming to the shape of the front of the vehicle formed by the bonnet 5 and panels 4. The extremities of the legs 9 are connected to the vehicle structure by hinges 10. In its stowed position (FIG. 1) the barrier member conforms closely to the surface of the vehicle. Each side leg 9 carries a bracket 11 connected to the rod 12 of a pneumatic ram 13 which will in practice be concealed, for example within the arches of wheels 3. Each ram is connected by way of conduit 14 to a pneumatic reservoir 15 (FIG. 1) which is maintained by a pump 16 driven, for instance, by an offtake 17 from the shaft of the dynamo 18 of the vehicle engine (not shown). Conduit 14 contains a valve 19, normally closed but which opens in response to a signal from a collision sensor 20.

Figure 2:
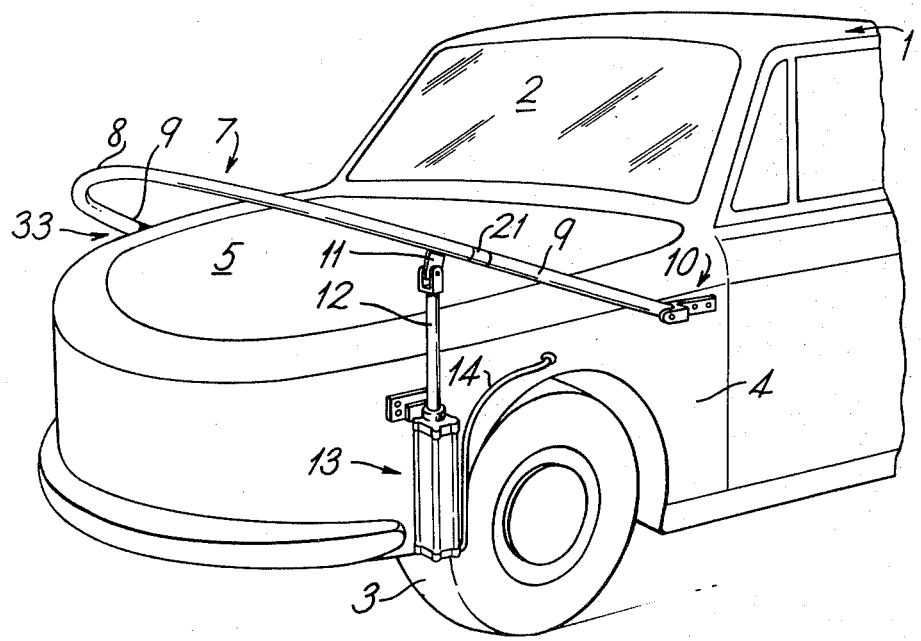
FIG. 2 is a similar perspective view showing the device in its operative position.

When the moving vehicle strikes a pedestrian the device 6 will be in its stowed position, and the entire body of the pedestrian will tend to come to rest for a short time on the bonnet 5. Sensor 20 will detect the collision in a manner such as that which will shortly be described, and the opening of valve 19 supplies power to rams 13 so that they raise device 6 to its operative position (FIG. 2). The operating speed of the device must be controlled so that it is in its operative position before the body has had time in typical circumstances to slide off the bonnet sideways or be thrown off it forwards by braking of the vehicle, but it must also be given sufficient delay to ensure that the rising of the device does not impede the initial arrival of the entire body upon the bonnet. A rise time of 0.4 sec. has been found suitable in tests for which the device, with a maximum radius of nearly 3ft 6ins. about the axis of hinges 10, was fitted to a typical saloon car. Delay devices, or the natural time lags of the chosen components, must ensure that rise does not begin at least until the centre of gravity of the victim has passed over the base 8 of tube 7.

Shear pins or similar fracture devices 21 ensure that if the vehicle hits a massive object, for example a similar vehicle, the impact forces will not be transmitted to the body of the vehicle and especially the passenger compartment.

Figure 3:
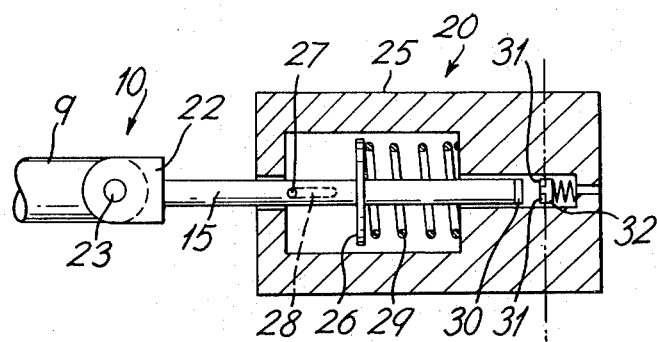
FIG. 3 is a detail of the hinge and sensor mechanism of the device.

FIG. 3 shows one possible construction in which the device 6 incorporates its own collision sensor 20. Here a hinge 10 comprises a bracket 22 with cross-pin 23, and this bracket is mounted on a rod 24 which slides within a housing 25 and carries a piston 26 and pin 27. Housing 25 is welded to side panels 4. Pin 27 slides within slots 28 in housing 25, to prevent rod 24 from rotating.

Piston 26 is urged to the left by a compression spring 29. When the base 8 of tube 7 hits a pedestrian, the impact with device 6 urges rod 24 to the right against the action of spring 29, and an electrically-conducting tip 30 of the shaft makes a circuit across contacts 31 carried by a spring-mounted block 32 within housing 25. This circuit energises the valve 19 which releases the air or gas from the reservoir 15 to supply power to rams 13 and so raise the device to its operative position, in which it presents a gap 33 between itself and the bonnet 5; the height of the rail must be chosen so that a body sliding off the bonnet towards the front, and towards a substantial part of each side, will tend to contain the body and restrain it from falling further. It may be arranged that the sensing mechanism can only operate to raise the device when it is apparent that the vehicle is in motion, for example when the ignition is switched on and the handbrake is released, and that the device once raised is locked into its operative position and can only be returned to its stowed position by the driver operating some overriding control.

Many modifications and additions of detail are of course possible. For instance, on operation of the device shown in FIGS. 1 and 2 it might be possible to raise not only the base 8 of tube 7 but also the hinges 10 so that the tube creates a gap of even depth between itself and the bonnet. A net or the like could be slung between the tube and the bonnet to lessen the chance of a body sliding through the gap 33 or suffering injury by being wedged in it, and the tube 7 illustrated could clearly be replaced by a member which blends more smoothly with the styling of the car when stowed, for instance by fitting into an open-topped peripheral recess in the side walls and the nose of the vehicle. Both hinges 10 and rams 13 would in practice of course be concealed as far as possible, rather than exposed as shown. Many alternatives to the hydraulic ram motors are also possible; for instance air bags within the space beneath the bonnet and responsive to the sensors to inflate rapidly upon collision. Inflation of the bags could cause them to bear against device 6 and raise it. Such bags, like the rams described should cause the barrier to rise quickly but the start of the rise should again be delayed until at least the centre of gravity of the victim has passed over the base 8 of the stowed tube 7.

It should also be noted that the bonnet 5 of FIGS. 1 and 2 is attached directly to the vehicle and itself makes no substantial movement relative to the rest of the vehicle while the safety device 6 rises. In particular the bonnet makes no substantial upward or forward movement, relative to the rest of the vehicle, at or around the moment of collision. Such movement would of course make the impact of the victim more severe.

We claim:

1. A safety device for fitting to a vehicle and comprising:
   a barrier member;
   a motor operable to move the member between a stowed position and an operative position;
   a sensor responsive to the collision of a body with the vehicle, and operative upon such response to activate the motor to move the member from its stowed to its operative position; and
   the member being adapted to form, when in its operative position, a barrier around an upward-facing surface, supported from said vehicle, whereby to restrain a body on such a surface from falling off it.

2. A safety device according to claim 1 in which the barrier member is substantially U-shaped, in which a pivot point is formed at each extremity of the U, and in which the member is pivotable by the motor about the pivot points to move between its stowed and operative positions.

3. A safety device according to claim 1 in which the sensor includes the barrier member, whereby impact of a body with the member in its stowed position activates the motor.

4. A safety device according to claim 1 in which the barrier member includes a fracture device which breaks upon impact of the vehicle with a massive object, e.g. another vehicle, thus preventing severe impact forces being transmitted to the vehicle by the barrier member.

5. A vehicle including:
   an upward-facing surface located adjacent the front of said vehicle;
   said surface being liable to receive pedestrian bodies with which the vehicle may collide;
   a barrier member;
   a motor operable to move said member between a stowed position and an operative position;
   a sensor responsive to the collision of a body with the vehicle, and operative on response to activate the motor to move the member from its stowed to its operative position;
   said member in its operative position creating a barrier to the front and sides around said upward-facing surface, whereby to restrain a body upon that surface from falling off it.

* * * * *